Patented Feb. 8, 1938

2,107,697

UNITED STATES PATENT OFFICE 2,107,697

STERILIZING FOODSTUFFS

Carroll L. Griffith and Lloyd A. Hall, Chicago, Ill., assignors to The Griffith Laboratories, Inc., Chicago, Ill., a corporation of Illinois No Drawing. Application May 29, 1936, Serial No. 82,457

4 Claims. (Cl. 99—225)

The present invention relates to the sterilization of vegetable matter of a nature which is food, or is an ingredient of food, for the purpose of minimizing or anihilating the content of bacteria or its spores, or molds and yeasts, or their spores, or any other infestation by living things.

Many substances which are subject to the process here described are used in compounding foods, such as breads, pastries, meats, beverages, sauces, etc. Such foods, or even the ingredients to be treated, are subject to spoilage, and often the spoilage is hastened by the quantity, or the type of organism that may be introduced by a certain ingredient. It has been uniformly supposed by most people that spices were antiseptic, but we have found some spices to contain as many bacteria as 16,000,000 per gram. Natural vegetable matter is laden with organisms, or their eggs or spores, and where such matter is normally dried, or dehydrated, or processed in many usual ways, some organisms may exist in dormant form, such as spores. The dormant forms are thus ready for activation by proper environment, as when the dried matter is incorporated into moist foods. Natural spices such as cloves, cinnamon, coriander, ginger, paprika, nutmeg, allspice, sage, mace, etc. are one type of a food ingredient which is used in small amount, yet which is infested with spores, more particularly of molds, yeasts and bacteria. Cocoa, corn flour, wheat flour, soy bean flour, rice flour and other grain products represent a type of ingredient that is used in large amount in foods, introducing bacteria, yeasts and molds. Dried vegetables such as onion powder, garlic powder, asparagus powder and others, are also guilty of contaminating foods. Dried fruits are also contemplated for treatment, such as raisins, prunes, peaches, apricots, figs, dates, raspberries, apples, etc. Materials such as meats of shell nuts and peanuts are also laden with organisms which can be eliminated by the present invention.

There are known processes which may be used to treat such materials to reduce or absolutely to kill the organisms therein, but these have many disadvantages. Some insecticidal agents are barred by toxicity to humans. Prolonged heat treatment changes the character of many things, injures many, or changes the appearance or quality. Long time action by heat is required, often with repeated treatment. Gases such as formaldehyde, hydro-cyanic gas, carbon disulphide, and carbon tetrachloride are effective, but they cannot be assuredly removed, and may leave a taste or odor. Gases are not certain in penetrating large bulk of material. Ethylene oxide has been proposed in admixture with nine parts of carbon dioxide, as a non-combustible gas. Large quantities are necessary at considerable cost to secure adequate results. The carbon dioxide stands in the way of the ethylene oxide at the point of action.

The present invention relates to a method of using undiluted ethylene oxide, safely, cheaply and efficiently, for treating food materials without detriment to the same. It is an object to impregnate the food material with such agent at a sufficiently toxic concentration to minimize or destroy the content of bacteria, yeasts and molds. It is another object of the invention to prepare the food material for the impregnation by subjecting it to a safe heat under vacuum.

As a result of a large number of experiments it has been determined that ethylene oxide may be safely and efficiently used for sterilization by first subjecting the food to heat and vacuum. This apparently removes water or moisture and cleans the surfaces and interior of the substance of adsorbed, or absorbed, or natural gases or moisture, whereby the material is activated to take up the ethylene oxide and possibly to increase its concentration locally by the powers of adsorption. The spores of the organisms may act in this same way so that a sufficiently high toxic concentration is locally produced in or on the spores. We believe that the preliminary heating of the foodstuff carries the spores of bacteria, yeast and molds through a short period of activation which is followed by conditions arresting development, thus to leave the spore in weaker condition, more dehydrated, and hence more vulnerable to a toxic gas.

The studies have further shown that there must be a sufficient applied concentration of ethylene oxide, and a sufficient time period of exposure, at an adequate temperature. These are three factors which must be coordinated to produce efficient results. One fixed condition of these factors may suffice for certain bacteria, and be deficient for other bacteria or for yeasts and molds, or vice versa. Likewise, one fixed condition of these factors may suffice for one kind of food, and be inadequate for another material.

In the studies of these factors it has been an objective to find a set of conditions which is universally satisfactory for all the types of foods above mentioned, to efficiently sterilize them as to bacteria, yeasts and molds, yet to preserve the appearance, quality, flavor, and ingredients from noticeable change. This is particularly true of natural spices and dried vegetables. These are readily darkened by heat in the air, and they lose their flavor and aromas by exposure to evaporation or by oxidation.

It has also been an object of these studies to apply a process to goods in certain types of packaged, as well as to bulk products. It has been found that by the action of vacuum, the process is highly effective on both bulk and packaged goods, assuring deep penetration of sterilizing gas into the material being treated.

Sterilizing spices by dry or moist heat above 240° F. ruins the color and flavor of the spice so as to make it unmarketable—that is, the natural color chromogens are partially or wholly destroyed, and the essential or volatile oil flavoring constituents are partially or wholly dissipated. It has been determined that substantially any food ingredient of the character subject to this invention may be heated at 220° F. in a vacuum for a considerable length of time without damage to it. This condition is not a sufficient sterilizing action, no matter how prolonged, where the food material is practically dry, in which condition the organisms are dormant by nature to resist destruction by heat. There is a tendency of course to sterilize, and this is supplemented by adding ethylene oxide in concentration to assure desired results. It has been determined that a sufficient concentration of ethylene oxide is required, at least 1 pound of ethylene oxide to 35 cu. ft. of evacuated space, irrespective of how much of the food material is in that space. The process may be carried out as follows:

The bulk or packaged material is placed in an autoclave which may be heated. A vacuum of about 18 inches is drawn and the contents heated to 220° F. This condition is maintained for one hour. This effects a dehydration and deadsorption of moisture, air and gases, preparing or activating the material for the gas treatment. In the case of packages it evacuates them of air. It may activate the spores and then arrest them.

Then the contents are cooled to about 150° F., and the vacuum is increased to a high value, such as 28 inches. This heightens the effects of the first evacuation, and the higher vacuum is more readily obtained at the lower temperature. Where spice oils and aromas are involved, the lower temperature tends to conserve them at the higher vacuum. A connection to a supply of ethylene oxide is made and the differential pressure introduces the gas. An amount equivalent to 1 pound per 35 cubic feet of autoclave space may be employed. The autoclave may contain a small or large amount, such as 800 lbs. of material for the 1 pound quantity of ethylene oxide. The vacuum of course drops, and it may go to from 18 inches to 24 inches more or less, depending upon the contents of the autoclave. The drop-value of the vacuum and the temperature of 150° F. are maintained, for about 2½ hours. Then the vacuum is released, excess ethylene oxide withdrawn, and the material aerated. This may be done by passing air through the autoclave or by exposure. Both methods serve to cool the contents down to normal room temperatures. It is preferred to pass air through the autoclave or retort until analysis shows the absence of residual ethylene oxide. Filtered and/or sterilized air may be used, but this may be dispensed with if the air source is relatively clean.

The foregoing process permits using material in burlap or paper bags or in corrugated cartons.

The following table illustrates the results with spices:

| Product | Count per gram | | | |
|---|---|---|---|---|
| | Bacteria | | Yeast and mold | |
| | Before | After | Before | After |
| Black pepper | 2,600,000 | 22,000 | 98 | 0 |
| Red pepper | 3,400,000 | 17,000 | 25 | 0 |
| Paprika | 670,000 | 30,650 | 200 | 0 |

This shows efficiencies of 99.15%, 99.2% and 99.4% for bacteria, and 100% for yeast and mold.

In another case the charge in an autoclave was:
1—25 lb. bag ground red pepper.
1—25 lb. bag ground black pepper hulls.
6—140 lb. bags whole black pepper.

The procedure above given was used and the vacuum dropped from 27 inches to 18 inches on admitting the ethylene oxide. The results are as follows:

| Product | Count per gram | | | |
|---|---|---|---|---|
| | Bacteria | | Yeast and mold | |
| | Before | After | Before | After |
| Red pepper | 3,400,000 | 17,000 | 2,500 | 20 |
| Ground hulls | 6,400,000 | 5,000 | 310 | 0 |
| Black pepper | 2,600,000 | 22,000 | 90 | 0 |

In each instance the efficiency is over 99% for bacteria and for yeast and molds.

With the materials of the last example it has been ascertained through a similar treatment that if the heating at 150° F. in the presence of ethylene oxide is for only 2 hours, rather than for 2½ hours, efficiency for bacteria is as follows:

```
                                                   Percent
Ground red pepper_____ 97.73
Ground black pepper hulls_____ 96.1
Whole black pepper_____ 86.3
``` and where ground paprika was added, an efficiency of 95.43%. This establishes the importance of the time factor, and the variability of the process according to the results desired.

No ethylene oxide is left in the products, regardless of how fine or coarse they are, or what oil content they have. There is no change in taste or odor, and practically no loss to be observed. The original characteristics are retained. The gluten in flours is not altered.

The use of ethylene oxide as a sterilizing agent has heretofore been avoided because of its volatile and combustible character, conducive to explosion when admixed with air. For this reason it has been proposed to use it diluted with inert gas such as carbon dioxide. But it is not thus very efficient and is expensive. By the present process the ethylene oxide is not diluted, but is distended by use in vacuo, and it is highly efficient because of absence of diluting gases, and because of the activation process.

The present application is related to our joint application Serial No. 145,154, filed May 27, 1937, as a continuation in part of the present application and generic hereto.

In the following claims the process is set forth in terms commensurate with the scope of the invention hereinabove described and claimed.

We claim:

1. The process of sterilizing dry food materials which comprises subjecting the material to a vacuum for about 1 hour at not over 220° F., reducing the temperature to about 150° F. and increasing the vacuum to a value near 28 inches, then admitting ethylene oxide into the evacuated space at least to a concentration of about 1 pound to 35 cubic feet of space, and exposing the material to the ethylene oxide for about 2½ hours.

2. The method of sterilizing natural dry spices which consists in heating the spices for at least one hour at 220° F. in a vacuum whereby to remove gas and moisture therefrom as an activation of the material, and then subjecting the activated material to the action of ethylene oxide at a concentration of at least 1 pound per 35 cubic feet at less than atmospheric pressure and at about 150° F. for 2½ hours, whereby at least 99% of the bacteria, mold and yeast of the original material is killed, without injury to the spice material.

3. The process of sterilizing dry food materials which comprises subjecting the material to a vacuum for about one hour at a non-destructive heat up to not over 240° F., reducing the temperature to about 150° F. and increasing the vacuum to a value near 28 inches, then admitting ethylene oxide into the evacuated space at least to a concentration of about 1 pound to 35 cubic feet of space, and exposing the material to the ethylene oxide for about 2½ hours.

4. The method of sterilizing natural dry spices which consists in heating the spices for at least one hour at a temperature from 220° F. to 240° F. in a vacuum whereby to remove gas and moisture therefrom as an activation of the material, and then subjecting the activated material to the action of ethylene oxide at a concentration of at least 1 pound per 35 cubic feet at less than atmospheric pressure and at about 150° F. for 2½ hours, whereby at least 99% of the bacteria, mold and yeast of the original material is killed, without injury to the spice material.

CARROLL L. GRIFFITH.
LLOYD A. HALL.